United States Patent
Schmidt et al.

(10) Patent No.: US 12,044,279 B2
(45) Date of Patent: Jul. 23, 2024

(54) COMPLIANT INTERLAYER

(71) Applicant: GOODRICH CORPORATION, Charlotte, NC (US)

(72) Inventors: Wayde R. Schmidt, Pomfret Center, CT (US); Paul Sheedy, Bolton, CT (US); John A. Sharon, West Hartford, CT (US); Neal Magdefrau, Tolland, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 607 days.

(21) Appl. No.: 17/243,319

(22) Filed: Apr. 28, 2021

(65) Prior Publication Data

US 2021/0388876 A1     Dec. 16, 2021

Related U.S. Application Data

(60) Provisional application No. 63/037,867, filed on Jun. 11, 2020.

(51) Int. Cl.
| | |
|---|---|
| *F16D 65/12* | (2006.01) |
| *F16D 69/02* | (2006.01) |
| *B64C 25/42* | (2006.01) |
| *F16D 65/02* | (2006.01) |

(52) U.S. Cl.
CPC ......... *F16D 65/126* (2013.01); *F16D 69/023* (2013.01); *B64C 25/42* (2013.01); *F16D 2065/132* (2013.01); *F16D 2200/0047* (2013.01); *F16D 2200/006* (2013.01); *F16D 2250/0061* (2013.01)

(58) Field of Classification Search
CPC ......... F16D 65/123–128; F16D 69/023; F16D 2065/132; F16D 2200/047; F16D 2200/006; F16D 2250/0061; B64C 25/47
USPC ........................................ 188/218 A, 218 XL
See application file for complete search history.

(56) References Cited

U.S. PATENT DOCUMENTS

| | | | |
|---|---|---|---|
| 5,199,481 A | * | 4/1993 | Corwin ................... C22C 47/08 164/105 |
| 7,393,559 B2 | | 7/2008 | Groza et al. |
| 8,053,069 B2 | | 11/2011 | Hao et al. |

(Continued)

FOREIGN PATENT DOCUMENTS

| | | |
|---|---|---|
| EP | 3712122 | 9/2020 |
| EP | 3805187 | 4/2021 |

OTHER PUBLICATIONS

European Patent Office, European Search Report dated Oct. 19, 2021 in Application No. 21174946.0.

(Continued)

*Primary Examiner* — Christopher P Schwartz
(74) *Attorney, Agent, or Firm* — SNELL & WILMER L.L.P.

(57) ABSTRACT

A brake component is disclosed. In various embodiments, the brake component includes a ceramic matrix composite (CMC) structure including a plurality of nominally dense plies, interleaved with a plurality of interlayers, wherein the plurality of nominally dense plies and the plurality of interlayers are bonded by at least one of a Field Assisted Sintering Technique (FAST), a Spark Plasma Sintering (SPS) process, or a localized heating process. In various embodiments, the brake component is a rotor disk or a stator disk.

18 Claims, 7 Drawing Sheets

(56) References Cited

U.S. PATENT DOCUMENTS

| | | | |
|---|---|---|---|
| 11,293,507 B2* | 4/2022 | Shula | D04H 1/498 |
| 11,649,191 B2* | 5/2023 | LeCostaouec | C04B 35/62894 |
| | | | 264/434 |
| 2006/0057387 A1* | 3/2006 | Magario | C22C 1/1005 |
| | | | 428/408 |
| 2012/0263935 A1* | 10/2012 | Ledford | D03D 15/00 |
| | | | 428/296.7 |
| 2014/0287641 A1* | 9/2014 | Steiner, III | F41H 5/0471 |
| | | | 428/317.1 |
| 2015/0183691 A1 | 7/2015 | Walter | |
| 2016/0136928 A1 | 5/2016 | Zhao et al. | |
| 2018/0335099 A1 | 11/2018 | Bianco et al. | |
| 2021/0039998 A1* | 2/2021 | Sheedy | C04B 35/5622 |
| 2021/0039999 A1* | 2/2021 | Sheedy | C04B 35/62852 |

OTHER PUBLICATIONS

Li Ran et al, "Fabrication of Short-CF/SIC Functionally Graded Materials", Materials Science Forum, Trans Tech Publications Ltd-Switzerland, CH, vol. 423-425, Oct. 15, 2005 (Oct. 15, 2005), pp. 253-256, XP001248759, ISSN: 0255-5476.

Wang Hai-Long et al, "Preparation and mechanical properties of laminated zirconium diboride/molybdenum composites sintered by spark plasma sintering" Frontiers of Materials Science In, China, vol. 3, No. 3, Jun. 24, 2009 (Jun. 24, 2009), pp. 273-280, XP055847238, ISSN: 1673-7377, DOI: 10.1007/s11706-009-0050-z Retrieved from the Internet: URL:http://link.springer.com/article/10.10 07/s11706-009-0050-z/fulltext.html>.

European Patent Office, European Office Action dated Jun. 21, 2023 in Application No. 21174946.0.

* cited by examiner

COMPLIANT INTERLAYER

CROSS-REFERENCE TO RELATED APPLICATIONS

This application claims priority to, and the benefit of, U.S. Provisional Patent Application No. 63/037,867, filed Jun. 11, 2020 and titled "COMPLIANT INTERLAYER," which is incorporated herein by reference in its entirety for all purposes.

FIELD

The present disclosure relates to aircraft wheel and brake systems and, more particularly, to layered components having plies interleaved with compliant interlayers for use within aircraft brake systems and other apparatus.

BACKGROUND

Aircraft typically utilize brake systems or mechanisms on wheels to slow or stop the aircraft during landings, taxiing and emergency situations, such as, for example, a rejected takeoff (RTO), which generally refers to application of a brake mechanism during an aborted takeoff and involves high braking loads over a short time period, resulting in a rapid increase in the brake temperature. A brake mechanism generally employs a heat sink comprising a series of friction disks, sandwiched between a pressure plate and an end plate, that may be forced into sliding contact with one another during a brake application to slow or stop the aircraft. Under various conditions, such brake applications may generate high temperatures and frictional loads throughout the heat sink and particularly on the surfaces of the stators and rotors and the pressure plate and the end plate that comprise the heat sink.

Various methods and materials may be employed to fabricate the components within a brake mechanism or heat sink such that the components are able to withstand the internal and surface stresses and the high temperatures that are generated during a brake application. Carbon/carbon (C/C) composite or ceramic matrix composite (CMC) structures, for example, comprise a plurality of either fiber-based plies, foam or other porous structures layered into a preform which may then be densified and machined to a final form. Traditional fabrication of C/C or CMC structures tends to rely on processes including chemical vapor infiltration (CVI), melt infiltration (MI) and polymer infiltration and pyrolysis (PIP), hot pressing, or glass transfer molding, each independently or in conjunction for densification of the C/C or CMC structure. The present techniques are, however, limited in their ability to produce C/C or CMC structures or materials capable of withstanding temperatures on the order of 2550° F. 1400° C.) or greater in oxidizing or combustion environments. Traditional bulk densification of C/C or CMC preforms by CVI tends to induce thermal stresses, mechanical stresses, or shrinkage, as well as density gradients, with such issues generally increasing in proportion to the preform thickness. Where plies are layered together to fabricate a laminated preform, techniques to improve the bonds between adjacent laminates are advantageous for improving the strength of the resulting composite and its ability to withstand the stresses and high temperatures experienced during operation.

SUMMARY

A brake component is disclosed. In various embodiments, the brake component includes a ceramic matrix composite (CMC) structure including a plurality of nominally dense plies, interleaved with a plurality of interlayers, wherein the plurality of nominally dense plies and the plurality of interlayers are bonded by at least one of a Field Assisted Sintering Technique (FAST), a Spark Plasma Sintering (SPS) process, a radiative heating process, or a localized Joule heating process. In various embodiments, the brake component is a rotor disk or a stator disk.

In various embodiments, the CMC structure comprises at least one of a silicon-carbide fiber/silicon-carbide matrix, a carbon fiber/carbon matrix or a carbon fiber/silicon-carbide matrix. In various embodiments, the CMC structure comprises at least one of an alumina matrix, a mullite matrix or a zirconium diboride matrix. In various embodiments, the CMC structure comprises one or more compositions, including, borides, carbides, oxides, phosphides, nitrides or mixed phases, including oxynitrides or oxycarbides; carbon or silicon-based compositions; refractory metal carbides; or silica and phosphate-based glasses or glass ceramics.

In various embodiments, the plurality of interlayers comprises forcespun or electrospun nanofiber mats or nanowire metal meshes. In various embodiments, the plurality of interlayers comprises nonwoven fabrics made of preceramic polymer nanofibers or polyacrylonitrile nanofibers. In various embodiments, the plurality of interlayers comprises at least one of a particulate, a chopped fiber, a nanotube, resin, or a slurry.

In various embodiments, the CMC structure is characterized by a gradation of a CMC composition among the plurality of nominally dense plies. In various embodiments, the gradation of the CMC composition is defined between a braking surface and a core layer of a rotor disk or a stator disk. In various embodiments, one or more of the plurality of nominally dense plies of the CMC structure comprises greater than sixty percent by volume of fiber. In various embodiments, at least one of the plurality of nominally dense plies comprises a monolithic ceramic composition.

An article of manufacture is disclosed. In various embodiments, the article of manufacture includes a ceramic matrix composite (CMC) structure including a plurality of nominally dense plies, interleaved with a plurality of interlayers, wherein the plurality of nominally dense plies and the plurality of interlayers are bonded by at least one of a Field Assisted Sintering Technique (FAST), a Spark Plasma Sintering (SPS) process, a radiative heating process or a localized Joule heating process.

In various embodiments, the CMC structure comprises at least one of a silicon-carbide fiber/silicon-carbide matrix, a carbon fiber/carbon matrix, a carbon fiber/silicon-carbide matrix, an alumina matrix, a mullite matrix, or a zirconium diboride matrix. In various embodiments, the CMC structure comprises one or more compositions, including, borides, carbides, oxides, phosphides, nitrides or mixed phases, including oxynitrides or oxycarbides; carbon or silicon-based compositions; refractory metal carbides; or silica and phosphate-based glasses or glass ceramics.

In various embodiments, the plurality of interlayers comprises forcespun or electrospun nanofiber mats or nanowire metal meshes. In various embodiments, the plurality of interlayers comprises nonwoven fabrics made of preceramic polymer nanofibers or polyacrylonitrile nanofibers. In various embodiments, the plurality of interlayers comprises at least one of a particulate, a chopped fiber, a nanotube, a resin or a slurry.

In various embodiments, the CMC structure is characterized by a gradation of a CMC composition among the plurality of nominally dense plies. In various embodiments, one or more of the plurality of nominally dense plies of the CMC structure comprises greater than sixty percent by volume of fiber. In various embodiments, at least one of the plurality of nominally dense plies comprises a monolithic ceramic composition.

A method of manufacturing a layered component is disclosed. In various embodiments, the method includes densifying a feedstock to generate a plurality of nominally dense plies; assembling the plurality of nominally dense plies, interleaved with a plurality of interlayers, to generate a preform structure; and bonding the preform structure via at least one of a Field Assisted Sintering Technique (FAST), a Spark Plasma Sintering (SPS) process, or a localized heating process.

The foregoing features and elements may be combined in various combinations, without exclusivity, unless expressly indicated herein otherwise. These features and elements as well as the operation of the disclosed embodiments will become more apparent in light of the following description and the accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of elucidation and not of limitation. Furthermore, any reference to the singular includes plural embodiments, and any reference to more than one component or step may include a singular embodiment or step. Likewise, references to "a," "an" or "the" may include one item or more than one item and such reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. As used herein, "distal" refers to a direction outward, or generally away, from a reference component and "proximal" or "proximate" refer to a direction inward, or generally, towards the reference component. All ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±5% or 2% of a given value.

Figure 1A:
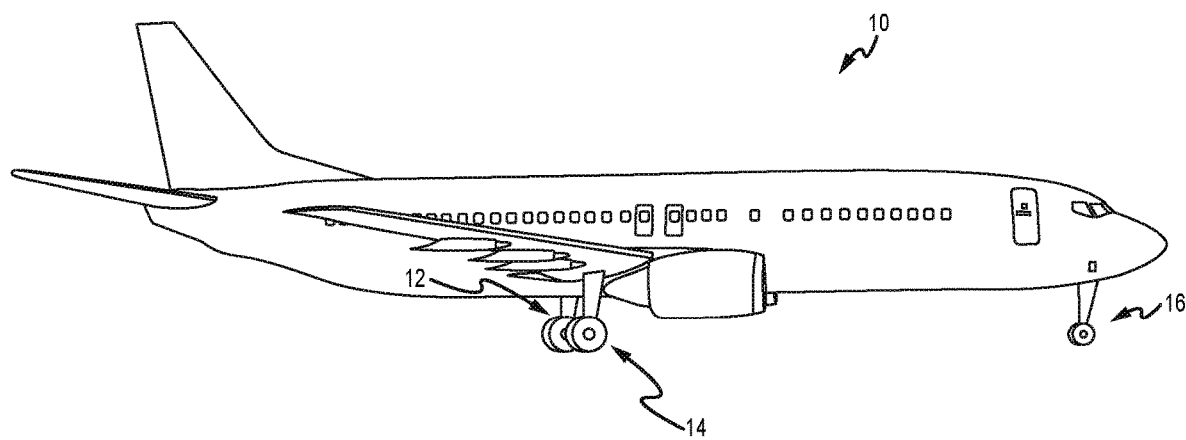
FIG. 1A illustrates an exemplary aircraft having a brake system, in accordance with various embodiments.
Figure 1B:
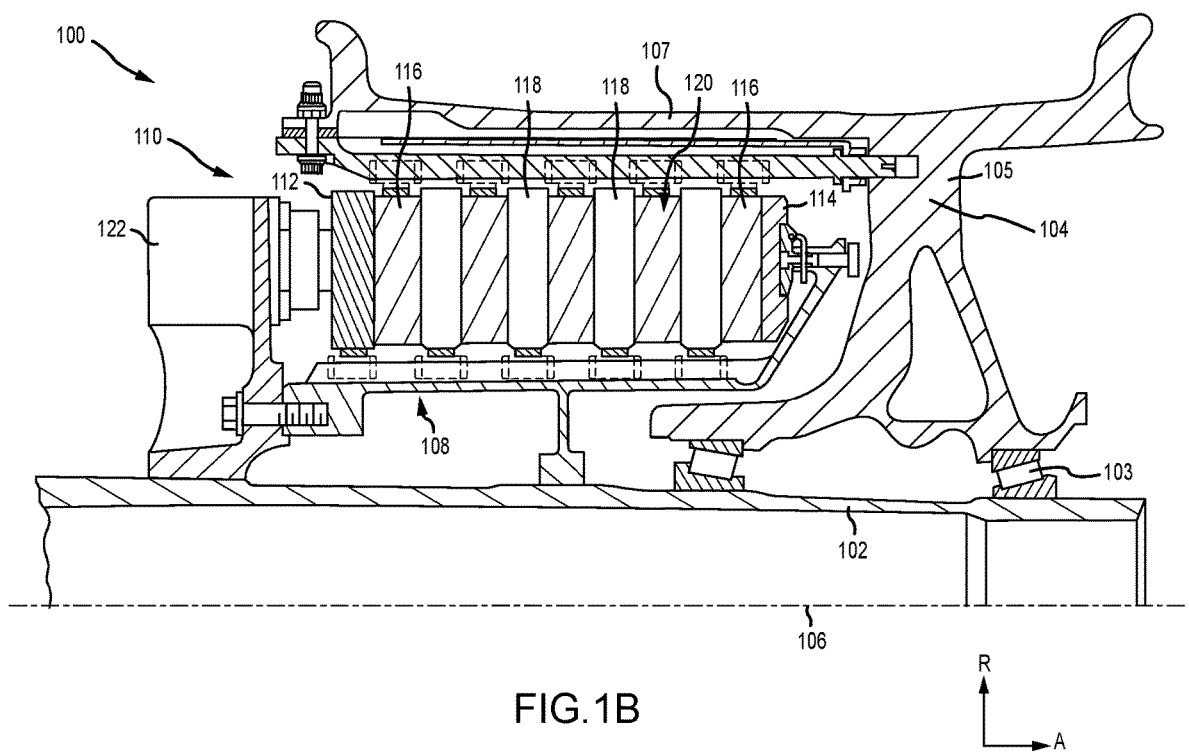
FIG. 1B illustrates a cross-sectional view of a brake mechanism, in accordance with various embodiments.

Referring now to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism 100 surrounds an axle 102 having a wheel 104 disposed thereon and configured to rotate about the axle 102 via one or more bearing assemblies 103. Typically, the wheel 104 includes a wheel web 105 and a wheel well 107, with the wheel well being generally cylindrical and coaxial with respect to a rotational axis (or a central axis 106) of the wheel. The central axis 106 extends through the axle 102 and defines a center of rotation of the wheel 104. A torque plate barrel 108 (sometimes referred to as a torque tube or barrel or a torque plate) is aligned concentrically with the central axis 106, and the wheel 104 is rotatable relative to the torque plate barrel 108. In various embodiments, the wheel 104 and the brake mechanism 100 comprise a wheel and brake assembly.

The brake mechanism 100 includes an actuator ram assembly 110, a pressure plate 112 disposed adjacent the actuator ram assembly 110, an end plate 114 positioned a distal location from the actuator ram assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118 and the end plate 114 together form a brake heat sink or a brake stack 120. The pressure plate 112, the end plate 114 and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114 and the plurality of stator disks 118.

An actuating mechanism for the brake mechanism 100 includes a plurality of actuator ram assemblies, including the actuator ram assembly 110, circumferentially spaced around a piston housing 122 (only one actuator ram assembly is illustrated in FIG. 1B). Upon actuation, the plurality of actuator ram assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the plurality of rotor disks 116 and the plurality of stator disks 118 are fabricated from various materials, such as, for example, carbon-carbon or ceramic matrix composite materials, that enable the brake disks to withstand and dissipate the heat generated during and following a braking action.

In various embodiments, the actuator ram assemblies may comprise electrically operated actuator rams or hydraulically operated actuator rams, although some brakes may use pneumatically operated actuator rams. In brake systems that employ fluid powered (e.g., hydraulic or pneumatic powered) actuator rams, the actuator ram assemblies may be coupled to a power source via a brake servo valve (BSV) and a shutoff valve (SOY). The SOV effectively functions as a shutoff valve, where in a first position (e.g., an armed position), fluid pressure is permitted to pass through the valve, and where in a second position a disarmed position) fluid pressure is restricted or prevented from passing through the valve. During normal braking, the SOY is in the armed position, thereby permitting the flow of fluid pressure. The BSV, based on braking commands from the pilot (often via an electronic controller that nay implement, for example, anti-skid logic) controls the amount of fluid pressure provided to the actuator ram and, thus, the braking force applied to the wheel. In electronic brake systems, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot or copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

According to various embodiments and with continued reference to FIG. 1B, a CMC structure may be one or more of the pressure plate 112, the end plate 114, the plurality of rotor disks 116 and the plurality of stator disks 118. Although the various components just mentioned and depicted in FIG. 1B are brake components, the processes and techniques described herein are applicable to any number of other structures such as, for example, gas turbine engine components, including, without limitation, airfoils, blades, vanes, disks, nozzles, heat exchangers, diffusers and combustors components. Further, the processes and techniques described herein are applicable to other articles of manufacture, including, for example, seals, rotors, cases, heatshields, beams and plates. Accordingly, the disclosure should be interpreted as applying to myriad articles of manufacture and not be limited to fabrication of brake components.

Figure 2:
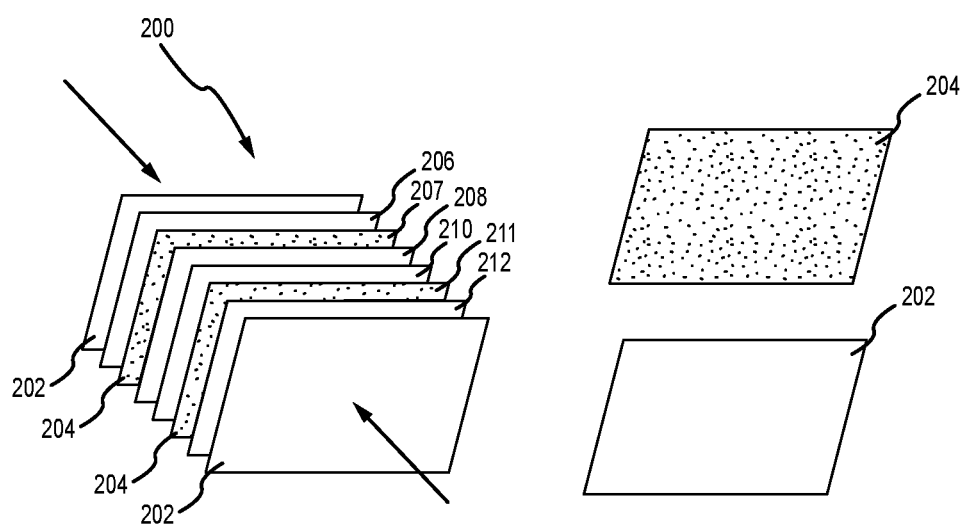
FIG. 2 is a schematic view of a plurality of nominally dense plies interleaved with a plurality of interlayers prior to bonding, in accordance with various embodiments.

Referring now to FIG. 2, a layered structure 200, prior to bonding, is illustrated having a plurality of nominally dense plies 202 (or laminates) interleaved with a plurality of interlayers 204 (or compliant interlayers), in accordance with various embodiments. For example, a first ply 206 and a second ply 208 are interleaved by a first interlayer 207 and a third ply 210 and a fourth ply 212 are interleaved by a second interlayer 211. In various embodiments the plurality of nominally dense plies 202 may comprise a ceramic matrix composite (CMC) structure such as, for example, a silicon-carbide fiber/silicon-carbide matrix, a carbon fiber/carbon matrix, or a carbon fiber/silicon-carbide matrix. In various embodiments, the plurality of nominally dense plies is characterized by an open or surface porosity of less that about 20% or less than about 5%; or, alternatively, by an apparent density of about 80% to about 100% or about 95% to about 100% of the theoretical maximum density for a CMC composition selected for densification. In various embodiments, the CMC structure, including either or both of the matrices and the fibers, may include one or more of, without limitation, alumina (e.g., an alumina matrix), mullite (e.g., a mullite matrix), or zirconium diboride (e.g., a zirconium diboride matrix). In various embodiments, the CMC structure may comprise one or more of borides, carbides, oxides, phosphides, nitrides or mixed phases including oxynitrides, oxycarbides and the like; carbon or silicon-based compositions; refractory metal carbides; silica and phosphate-based glasses or glass ceramics; and oxides, including, for example, aluminum oxide, zirconium oxide or zirconium dioxide, hafnium oxide, rare earth oxides, or combinations thereof. In various embodiments the borides may be selected among a group comprising: $ZrB_2$, $HfB_2$, $VB_2$, $TiB_2$, $TaB_2$, $TaB$, $NbB_2$, $NbB$, $CrB_2$, $Mo_2B_5$, $W_2B_5$, $Fe_2B$, $FeB$, $Ni_2B$, $NiB$, $LaB_6$, $CoB$, $Co_2B$, or any other refractory boride. In various embodiments, the carbides may be selected among a group comprising: SiC, HfC, ZrC, C, $B_4C$, SiOC, SiBCN, TiC, WC, $Mo_2C$, TaC, NbC, or any other refractory carbide. In various embodiments, the oxides may be selected among a group comprising: $HfO_2$, $ZrO_2$, $Al_2O_3$, $SiO_2$, class compositions including aluminosilicates, borosilicates, lithium aluminosilicates (LAS), magnesium aluminosilicates, barium magnesium aluminosilicates (BMAS), calcium aluminosilicates or other silica containing high temperature glasses, or other mixed metal oxides. In various embodiments, the nitrides may be selected among a group comprising: AlN, $Si_3N_4$, SiAlON, TaN, TiN, TiAlN, $W_2N$, WN, $WN_2$, VN, ZrN, BN, HfN, NbN, or any other refractory nitrides. In various embodiments, the CMC structure may comprise mixed refractory nonoxides such as, for example, SiCN. While the disclosure focuses on the plurality of nominally dense plies 202 comprising CMC structures, the disclosure is not so limited and contemplates the plurality of nominally dense plies 202 comprising other materials, such as, for example, metallic materials.

In various embodiments, the plurality of interlayers 204 may comprise one or more of a variety of compliant materials or structures, including, for example, forcespun or electrospun nanofiber mats, nanowire metal meshes or mats, green fiber mats, cured fiber mats, flexible preceramic resin films, flexible ceramic, glass or metal films, porous films, photocurable filled systems, self-leveling fluids, preceramic-based nanofiber cloth, carbon films and cloth or similar compliant materials or structures. In various embodiments, the plurality of interlayers may comprise flexible nonwoven fabrics made of preceramic polymer nanofibers (e.g., SiOC, SiC, $Si_3N_4$ or the like), polyacrylonitrile nanofibers, or other carbon-precursor based nanofibers. In various embodiments, the plurality of interlayers may comprise submicron or micron-scale thick foils of metal, ceramic or glass. In various embodiments, the plurality of interlayers comprises at least one of a particulate, a chopped fiber, a nanotube, a resin or a slurry. In further examples, the nanofibers within the interlayers include carbide-, nitride-, oxycarbide-, oxynitride-, carbonitride-, silicate-, boride-, phosphide-, or oxide-based fibers. In still further examples, the fibers are fully crystalline, partially crystalline or predominantly amorphous or glassy. In various embodiments, the plurality of interlayers may comprise mats fabricated from other materials, including, for example, tape cast sheets comprising a resin, particulates, continuous or chopped fibers (nanofiber or otherwise), or nanotubes or the like. Use of the aforementioned or similar compliant materials for the interlayers provides several functional advantages to the layered structure 200, either during fabrication or following fabrication and while in use (e.g., as a rotor or stator within a brake mechanism). Various of the advantages include, for example, a reduction in asperities between adjacent pairs of plies or laminates, the ability to drape the interlayer over irregularly shaped surfaces or multiple surfaces, the ability to conform to surface irregularities, the ability to fill voids between adjacent pairs of plies or laminates, the ability to provide a compositional change to the fabricated layered structure, and the ability to densify joints between adjacent pairs of plies or laminates. In addition, the interlayers may be fabricated independently of the plies or laminates and, upon assembly and bonding, the interlayers enable an intimate contact to be established between the plies or laminates.

Figure 3A:
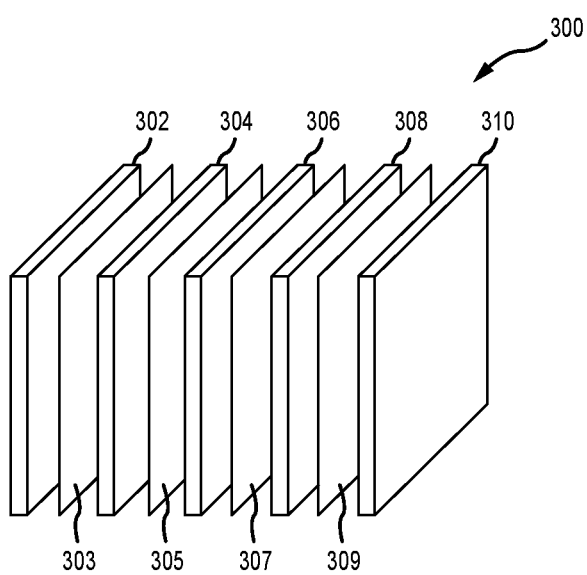
FIG. 3A illustrates a plurality of nominally dense plies of a CMC structure interleaved with a plurality of interlayers prior to bonding, in accordance with various embodiments.
Figure 3B:
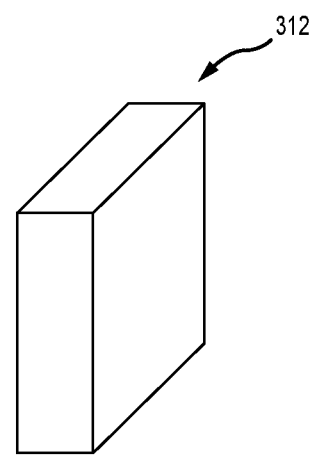
FIG. 3B illustrates a CMC structure comprising a plurality of nominally dense plies interleaved with a plurality of interlayers following bonding, in accordance with various embodiments.

Referring now to FIG. 3A, a layered structure 300, prior to bonding, is illustrated having a plurality of nominally dense plies, including, for example, a first ply 302, a second ply 304, a third ply 306, a fourth ply 308 and a fifth ply 310, interleaved by a plurality of compliant interlayers, including, for example, a first interlayer 303, a second interlayer 305, a third interlayer 307 and a fourth interlayer 309, respectively. The pluralities of plies and interlayers are similar to the plurality of nominally dense plies 202 and the plurality of interlayers 204 described above with reference to FIG. 2. Following assembly and bonding, a layered component 312, as illustrated in FIG. 3B, may be machined or otherwise processed into a final form, such as, for example, a brake component. In various embodiments, machining of the plies may take place prior to assembly and bonding, or both prior to and after assembly and bonding. During fabrication, each of the plies (302, 304, 306, 308, 310) is densified to a nominal density prior to arrangement with the interlayers (303, 305, 307, 309) for assembly. In various embodiments, the plies may be densified by one or more of any of the densification techniques known to those skilled in the art, such as, for example, PIP, CVI, MI, chemical vapor deposition (CVD), slurry casting, atomic layer deposition (ALD), hot pressing, glass transfer molding, or the like. In various embodiments, an ALD process is employed to enable a more complete densification of the plies (or the feedstock) prior to bonding.

In various embodiments, the ALD process works by first adsorbing a nominal (mono)layer of a precursor on one or more surfaces of the feedstock (e.g., a fiber based structure such as a ply, a layer or a foam structure), purging the excess precursor, and then introducing a second reactant that converts the adsorbed layer to the desired chemistry. This results in a self-limiting, non-line-of-sight deposition of substantially uniform, pinhole-free, conformal coating even on substrates with high aspect ratio (e.g., greater than 1000:1) features. The reaction conditions are chosen to achieve the best combination of precursor adsorption and subsequent reaction, with typical growth per cycle in the range of one-half to one Angstrom (0.5-1 Å). Compositions can vary from metals to oxides and other ceramics (e.g., borides, carbides, nitrides or the like as described above), multilayer structures and even polymers such as, for example, by means of Molecular Layer Deposition (MLD). Although tending to have comparatively low deposition rates to other vapor densification processes, ALD coating processes, such as, for example, those used for $Al_2O_3$, may be used to deposit several tens of microns of material. Additionally, a methodology known as "spatial ALD"—whereby the feedstock moves through different reaction zones of a reactor (vs. "temporal ALD" where the reactants are purged in and out of a reactor containing the feedstock)—may tend to increase throughput and tend to enable roll-to-roll processing having deposition rates on the order of microns per minute. In this regard, the plies (302, 304, 306, 308, 310) (or a plurality of nominally dense plies) may be produced utilizing higher throughput ALD techniques such as spatial ALD. In various embodiments, the feedstock plies may be densified via any suitable rapid processing densification technique in continuous or batch operations.

In various embodiments, the ALD process tends to enable substantially uniform build-up of material on exposed surfaces, throughout high aspect ratio substrates (including, for example, fibers, microcracks, and gaps) and even among several preform parts in a deposition chamber. In comparison to other vapor densification processes, ALD would tend to enable more uniform filling of a CMC structure (or any fiber, particulate, or other type of preform or substrate or feedstock) and therefore tends to inhibit "canning off" or to facilitate a substantial reduction in "canning off" of the feedstock based purely on geometric considerations. Stated another way, certain CMC feedstock preforms may possess geometries tending to promote densification at the feedstock surface, tending thereby to accelerate surface deposition and tending thereby to inhibit interior densification of the preform (e.g., by closing gas paths to the preform interior). In this regard, the interior of a preform may be "canned off" from the surface layers tending thereby to seal it from further densification, creating a density gradient in the component.

As compared to CVI, the deposition rate for ALD (with sufficient time for diffusion) also does not change due to the process being an inherently self-limiting surface reaction. A CVI or CVD densification process, for example, may result in a density gradient from outside-in (e.g., from diffusional processes) and, due to geometrical constraints, may result in a more rapid reaction and "canning-off" of a pore structure of the feedstock. In contrast, ALD tends to continue to uniformly and completely fill the pore structure due to being a series of self-limiting surface reactions which do not result in non-uniform nucleation and growth of the deposited material as is seen in CVI processes. In various embodiments, utilizing a reduced feedstock volume, such as a single ply, may tend to improve part densification. In various embodiments, the ALD process tends to enable manufacture of CMC structures with relatively higher fiber or other reinforcement content loading (e.g., structures comprising greater than sixty percent (60%) by volume fiber or other reinforcement) than the other densification processes described herein. In this regard, ALD densification of feedstock plies may tend to improve the mechanical properties of CMC structures. In various embodiments, feedstock plies may be cut to shape, machined or laid up in a mold prior to densification thereby enabling production of nominally dense plies of arbitrary shape or curvature. For example, individual feedstock plies may be densified in a mold having an annular shape for a brake component or a mold having the curvature of an airfoil to generate a nominally dense ply having an annular structure or an airfoil curvature.

In various embodiments, as shown, for example, in FIGS. 3A and 3B, each of the nominally dense plies (302, 304, 306, 308, 310) may be layered and bonded at contact interfaces between each of the plies to form the layered component 312 (e.g., a uniform CMC structure) comprising the bonded layers of nominally dense plies (302, 304, 306, 308, 310) interleaved with the interlayers (303, 305, 307, 309). For example the first ply 302 and the second ply 304 may make surface contact with the first interlayer 303 at contact interfaces and bonded via at least one of a Field Assisted Sintering Technique (FAST), a Spark Plasma Sintering (SPS) process, or a similar method that facilitates localized heating at the contact interfaces to be bonded. Each of the remaining plies and interlayers may similarly be bonded via the localized heating process to build up the layered component. In various embodiments, the interlayers promote bonding and enhance interlaminar properties (e.g., mechanical, thermal, electrical or the like) of the layered component 312. In addition to the examples identified above, the interlayers may comprise a particulate, a chopped fiber, a nanotube, a slurry or the like. Exemplary particulate compositions include those previously described for carbides, oxides, nitrides and borides, and include morphologies ranging from spherical or acicular to elongated, and sizes ranging from nanometer or submicron to tens of microns. Exemplary chopped fibers include carbon, silicon carbide, silicon nitride, silicon oxycarbide and oxides. Exemplary slurries may be aqueous or organic solvent based suspensions or dispersions of ceramic, metal or carbonaceous particulates.

Figure 4A:
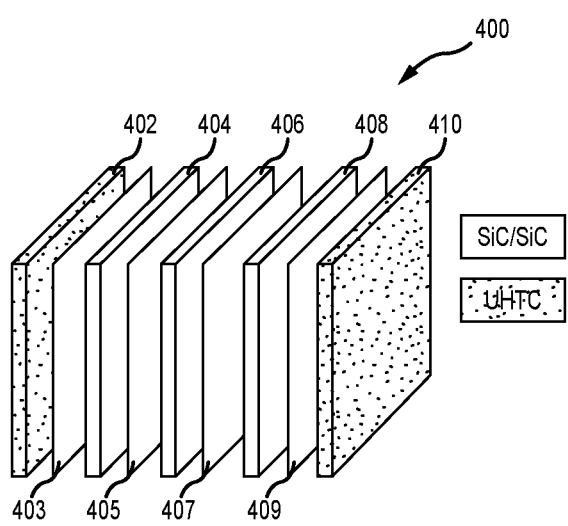
FIG. 4A illustrates a plurality of nominally dense plies of a CMC structure interleaved with a plurality of interlayers prior to bonding, in accordance with various embodiments.

Referring now to FIG. 4A, a layered structure 400, prior to bonding, is illustrated having a plurality of nominally dense plies, including, for example, a first ply 402, a second ply 404, a third ply 406, a fourth ply 408 and a fifth ply 410, interleaved by a plurality of interlayers, including, for example, a first interlayer 403, a second interlayer 405, a third interlayer 407 and a fourth interlayer 409, respectively. The pluralities of plies and interlayers are similar to the plurality of nominally dense plies 202 and the plurality of interlayers 204 described above with reference to FIG. 2. In various embodiments, the plies (402, 404, 406, 408, 410) and the interlayers (403, 405, 407,409) may be bonded to form a sandwich-like CMC structure defined by a set of core plies (404, 406, 408) (or inner plies, shown in light shade) of a first CMC composition (e.g., a SiC/SiC composition) and a set of face plies (402, 410) (or outer plies, shown in dark shade) of a second CMC composition (e.g., an ultra-high temperature ceramic (UHTC) composition, an environmental barrier coating (EBC) composition or a thermal barrier coating (TBC) composition). In various embodiments, a CMC composition may include a monolithic ceramic composition (e.g., a non-fiber reinforced composition). In various embodiments, the core plies (404, 406, 408) may have an alternating fiber orientation whereby the fibers of each of the respectively adjacent plies are set at a non-parallel relative angle. For example, the fibers within a center core ply (406) may be set at an angle of zero degrees (0°) relative to a reference direction, while the fibers within each of the respectively adjacent core plies (404, 408) may be set orthogonal (or at ninety degrees)) (90°)) with respect to the fibers within the center core ply (406). In various embodiments, the structure just described may be used in a brake component, such as, for example, a rotor disk or a stator disk, with the face plies (402, 410) (e.g., a frictional surface or a braking surface) constructed of an ultra-high temperature composition (e.g., a UHTC composition) and the core plies (or the core of the rotor disk or the stator disk) constructed of a relatively lower temperature composition (e.g., a SiC/SiC composition).

Figure 4B:
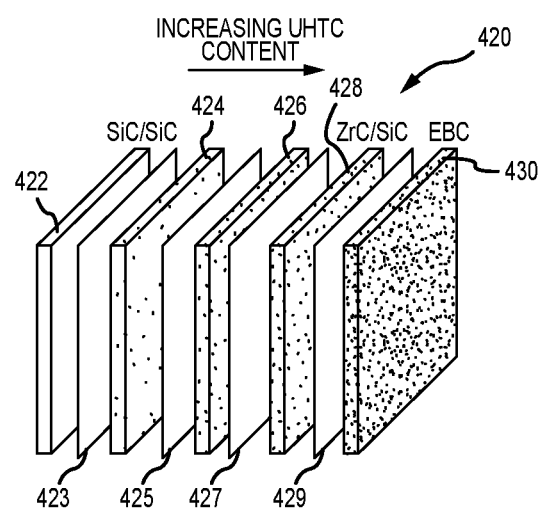
FIG. 4B illustrates a plurality of nominally dense plies of a CMC structure interleaved with a plurality of interlayers prior to bonding, in accordance with various embodiments.

Referring now to FIG. 4B, a layered structure 420, prior to bonding, is illustrated having a plurality of plies, including, for example, a first ply 422, a second ply 424, a third ply 426, a fourth ply 428 and a fifth ply 430, interleaved by a plurality of interlayers, including, for example, a first interlayer 423, a second interlayer 425, a third interlayer 427 and a fourth interlayer 429, respectively. The pluralities of plies and interlayers are similar to the plurality of nominally dense plies 202 and the plurality of interlayers 204 described above with reference to FIG. 2. In various embodiments, the plies (422, 424, 426, 428, 430) and the interlayers (423, 425, 427,429) may be bonded to form a gradated-like CMC structure defined by a gradation between a ply (422) having a relatively lower temperature CMC composition and a ply (430) having a UHTC CMC composition or a EBC or TBC composition. The CMC composition of the plurality of plies (422, 424, 426, 428, 430), interleaved by the plurality of interlayers (423, 425, 427,429), may vary along a gradient (illustrated as a lighter to a darker shade of the plies) defined from the low temperature CMC plies and increasing to the high temperature CMC plies. In various embodiments a gradated CMC structure, such as, for example, a combustor liner, may be optimized to include relatively high temperature CMC compounds proximate a flame front and relatively low temperature CMC compounds away from the flame front. In another example, a turbine vane or blade may be fabricated to comprise the relatively high temperature CMC compounds proximate an aerodynamic surface and the relatively low temperature CMC compounds or plies proximate a core layer, with a gradated-like structure therebetween. In this regard, a CMC structure may be optimized for compositions tending thereby to reduce material costs and production costs and time while tending to increase mechanical and thermal performance of the CMC structure. As will be appreciated by those skilled in the art, the gradation may be tailored for any number of desirable physical, thermal, electrical, material, and mechanical properties including, but not limited to coefficient of thermal expansion, toughness, hardness, strength, friction and wear performance, thermal and electrical conductivities, elastic modulus, heat capacity, oxidation behavior and density. Note also that in various embodiments, one or more of the interlayers (423, 425, 427,429), particularly the interlayers adjacent a wear surface, may prove advantageous in repair or refurbishment operations. For example, if a brake wear surface becomes worn through use, then the ply (or plies) that forms the wear surface may be machined away and replaced with a new interlayer and ply (or interlayers and plies), assembled and bonded to the outer surface that results following the machining away, thereby forming a new wear surface.

Figure 4C:
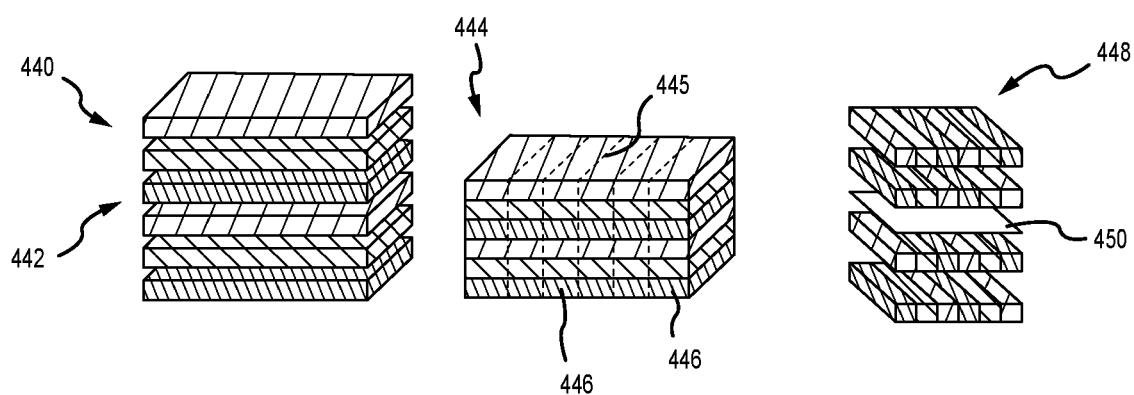
FIG. 4C illustrates a plurality of nominally dense plies of a CMC structure interleaved with an interlayer subsequent to a first bonding and prior to a second bonding, in accordance with various embodiments.

Referring now to FIG. 4C, a layered structure 440, prior to bonding, is illustrated having a plurality of plies 442 In various embodiments, the plurality of plies 442 may include nominally dense plies as described above, interleaved by a plurality of compliant interlayers. The pluralities of plies and interlayers are similar to the plurality of nominally dense plies 202 and the plurality of interlayers 204 described above with reference to FIG. 2. In various embodiments, the plurality of nominally dense plies 442 and, if incorporated, the plurality of compliant interlayers, may be bonded to form a gradated-like CMC structure similar to those described above with reference to FIGS. 4A and 4B, where nominally defense plies having differing thermal or structural properties (plies having different properties are indicated in FIG. 4C using different styles of shading) are arranged to provide an optimized structure for use with, for example, a brake component (e.g., a rotor or stator), an airfoil (e.g., a turbine blade or vane) or a combustor component (e.g., a combustor liner or hear shield). In a first step, the layered structure 440 is bonded using, for example, a FAST process to generate a layered structure 444. Following the boding, the layered structure 444 may be machined to generate a layered component or to generate layered subcomponents for subsequent assembly. As illustrated, for example, the layered component 444 may be cut into a plurality of sublayers 446 having gradated properties similar to those described above, the cuts being made along a plurality of cutting planes 445. In a subsequent step, the plurality of sublayers 446 may be reoriented (e.g., rotated with respect to one another) into a modified layered structure 448. In various embodiments, one or more compliant interlayers 450 are interleaved within the modified layered structure 448 and a second bonding process (e.g., a FAST process) is applied. The resulting layered structure or component may thus be tailored with specialized gradated properties in different directions and at different locations throughout the resulting layered structure to provide specialized thermal or structural attributes of the final component.

Figure 5:
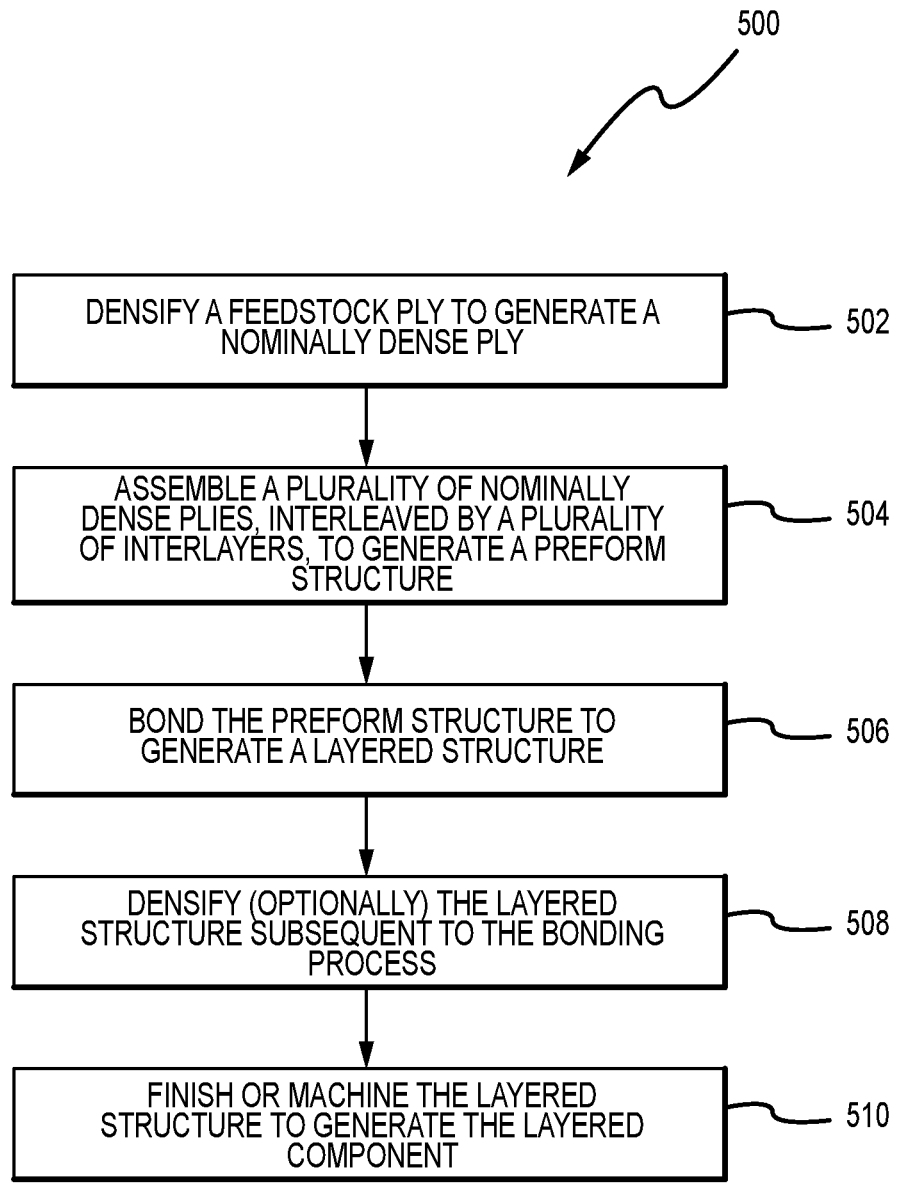
FIG. 5 illustrates a flowchart describing various steps of a method for manufacturing a layered component, in accordance with various embodiments.

Referring now to FIG. 5, a method 500 of manufacturing a layered component having a plurality of plies interleaved by a plurality of interlayers, is described. A first step 502 includes performing a densification of a feedstock ply to generate a nominally dense ply. In various embodiments, the nominally dense ply may have an apparent density between ninety percent (90%) and one-hundred percent (100%) of the theoretical maximum density for a CMC composition selected for densification of the feedstock ply. A second step 504 may include assembling a plurality of nominally dense plies, interleaved by a plurality of interlayers, to generate a preform structure. A third step 506 includes bonding the preform structure to generate a layered structure. In various embodiments, the third step 506 includes bonding the preform structure via a FAST process, an SPS process, a radiative heating process, a Joule heating process or a similar process or method that facilitates a localized heating at the bonding interface between the plies and the interlayers. In various embodiments, a fourth step 508 includes performing a secondary densification process to the layered structure subsequent to the bonding process such as, for example, an ALD or a CVD densification process. In various embodiments, the secondary densification may also occur during the bonding operation (e.g., during the FAST process) of the third step 506. In various embodiments, a fifth step 510 includes finishing or machining the layered structure or applying a surface coating to the layered structure to generate the layered component. In various embodiments, machining of the plies may take place prior to or between the assembly and bonding steps, or both prior to or between and after the assembly and bonding steps.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A brake component, comprising:
   a ceramic matrix composite (CMC) structure including a plurality of nominally dense plies, interleaved with a plurality of interlayers, wherein the CMC structure comprises greater than sixty percent by volume of fiber,
   wherein the plurality of nominally dense plies and the plurality of interlayers are bonded by at least one of a Field Assisted Sintering Technique (FAST), a Spark Plasma Sintering (SPS) process, a radiative heating process, or a localized Joule heating process, and
   wherein the plurality of nominally dense plies are densified using an atomic deposition (ALD) process prior to bonding.

2. The brake component of claim 1, wherein the brake component is a rotor disk or a stator disk.

3. The brake component of claim 1, wherein the CMC structure comprises at least one of a silicon-carbide fiber/silicon-carbide matrix, a carbon fiber/carbon matrix or a carbon fiber/silicon-carbide matrix.

4. The brake component of claim 1, wherein the CMC structure comprises at least one of an alumina matrix, a mullite matrix or a zirconium diboride matrix.

5. The brake component of claim 1, wherein the CMC structure comprises one or more compositions, including:
   borides, carbides, oxides, phosphides, nitrides or mixed phases, including oxynitrides, or oxycarbides;
   carbon or silicon-based compositions;
   refractory metal carbides; or
   silica and phosphate-based glasses or glass ceramics.

6. The brake component of claim 1, wherein the plurality of interlayers comprises forcespun or electrospun nanofiber mats or nanowire metal meshes, nonwoven fabrics made of preceramic polymer nanofibers or polyacrylonitrile nanofibers.

7. The brake component of claim 1, wherein the plurality of interlayers comprises at least one of a particulate, a chopped fiber, a nanotube, a resin or a slurry.

8. The brake component of claim 1, wherein the CMC structure is characterized by a gradation of a CMC composition among the plurality of nominally dense plies.

9. The brake component of claim 8, wherein the gradation of the CMC composition is defined between a braking surface and a core layer of a rotor disk or a stator disk.

10. The brake component of claim 1, wherein at least one of the plurality of nominally dense plies comprises a monolithic ceramic composition.

11. An article of manufacture, comprising:
    a ceramic matrix composite (CMC) structure including a plurality of nominally dense plies, interleaved with a plurality of interlayers, wherein the CMC structure comprises greater than sixty percent by volume fiber,
    wherein the plurality of nominally dense plies and the plurality of interlayers are bonded by at least one of a Field Assisted Sintering Technique (FAST), a Spark Plasma Sintering (SPS) process, a radiative heating process, or a localized Joule heating process, and
    wherein the plurality of nominally dense plies are densified using an atomic deposition (ALD) process prior to bonding.

12. The article of manufacture of claim 11, wherein the CMC structure comprises at least one of a silicon-carbide fiber/silicon-carbide matrix, a carbon fiber/carbon matrix, a carbon fiber/silicon-carbide matrix, an alumina matrix, a mullite matrix, or a zirconium diboride matrix.

13. The article of manufacture of claim 11, wherein the CMC structure comprises one or more compositions, including:
    borides, carbides, oxides, phosphides, nitrides or mixed phases, including oxynitrides, or oxycarbides;
    carbon or silicon-based compositions;
    refractory metal carbides; or
    silica and phosphate-based glasses or glass ceramics.

14. The article of manufacture of claim 11, wherein the plurality of interlayers comprises forcespun or electrospun nanofiber mats or nanowire metal meshes, nonwoven fabrics made of preceramic polymer nanofibers or polyacrylonitrile nanofibers.

15. The article of manufacture of claim 11, wherein the plurality of interlayers comprises at least one of a particulate, a chopped fiber, a nanotube, a resin or a slurry.

16. The article of manufacture of claim 11, wherein the CMC structure is characterized by a gradation of a CMC composition among the plurality of nominally dense plies.

17. The article of manufacture of claim 11, wherein at least one of the plurality of nominally dense plies comprises a monolithic ceramic composition.

18. A method of manufacturing a layered component, comprising:
    densifying, using an atomic layer deposition (ALD) process, a feedstock to generate a plurality of nominally dense plies, wherein the plurality of nominally dense plies include ceramic matric composite (CMC) structures;
    assembling the plurality of nominally dense plies, interleaved with a plurality of interlayers, to generate a preform structure; and
    bonding the preform structure via at least one of a Field Assisted Sintering Technique (FAST), a Spark Plasma Sintering (SPS) process, a radiative heating process, or a localized Joule heating process.

* * * * *